United States Patent [19]

McCauley, III

[11] Patent Number: 5,066,498

[45] Date of Patent: * Nov. 19, 1991

[54] NUTRITIONAL SUPPLEMENT FOR THE HOOF AND COAT

[75] Inventor: C. Graham McCauley, III, Versailles, Ky.

[73] Assignee: McCauley Brothers, Inc., Versailles, Ky.

[ * ] Notice: The portion of the term of this patent subsequent to Mar. 19, 2008 has been disclaimed.

[21] Appl. No.: 669,673

[22] Filed: Mar. 14, 1991

Related U.S. Application Data

[63] Continuation of Ser. No. 400,830, Aug. 30, 1989, Pat. No. 5,000,964.

[51] Int. Cl.$^5$ .................................................. A23K 1/00
[52] U.S. Cl. .......................................... 426/2; 426/62; 426/74; 426/72; 426/335; 426/532; 426/541; 426/623; 426/656; 426/658; 426/807
[58] Field of Search ................ 426/2, 62, 72, 74, 623, 426/630, 541, 656, 658, 532, 335, 807

[56] References Cited

U.S. PATENT DOCUMENTS

| | | | |
|---|---|---|---|
| 4,439,525 | 3/1984 | Shay et al. | 426/60 |
| 4,465,701 | 8/1984 | Holman et al. | 426/520 |
| 4,582,708 | 4/1986 | Tipton et al. | 426/72 |
| 5,000,964 | 3/1991 | McCauley | 426/62 |

OTHER PUBLICATIONS

Morrison, "Feeds and Feeding", The Morrison Publishing Co., Ithaca, New York (1956), pp. 72–73 & 112–113.

*Primary Examiner*—R. B. Penland
*Attorney, Agent, or Firm*—King and Schickli

[57] ABSTRACT

A hoof and coat supplement composition for domestic animals comprises by weight percent substantially:
96.0% to 0.0% palatable carrier;
50.0% to 2.0% methionine;
0.25% to 0.01% biotin
20.0% to 2.0% live yeast culture and yeast fermentation solubles;
5.0% to 1.25% zinc in chelated form;
0.40% to 0.0% preservative;
1.5% to 0.0% antioxidant agent; and
20.0% to 0.0% flavoring agent.

17 Claims, No Drawings

NUTRITIONAL SUPPLEMENT FOR THE HOOF AND COAT

This patent application is a continuation of U.S. patent application Ser. No. 400,830 filed on Aug. 30, 1989 and entitled "Nutritional Supplement For the Hoof and Coat", U.S. Pat No. 5,000,964.

TECHNICAL FIELD

The present invention relates generally to nutritional supplements and, more particularly, to such compositions specifically adapted for correcting a number of different nutrient deficiencies and improving the overall quality of the skin, hoof and coat of a domestic animal.

BACKGROUND OF THE INVENTION

Deficiencies in vitamins, minerals and essential amino acids, which cannot be synthesized in the body and must be consumed in the diet, are well known to have adverse effects on the various members of the animal kingdom. More particularly, a number of such deficiencies adversely affect the quality of the skin, hair coat and hooves of, for example, domestic farm animals as well as show and race horses.

Keratin is a protein which constitutes almost the entire dry weight of hair and hooves. It, therefore, is clear that the growth of healthy hair and hooves is dependent on the synthesis of this protein. A number of vitamins, minerals and essential amino acids affect this synthesis.

Biotin is a vitamin synthesized by bacterial fermentation in the digestive tract of sheep, cattle, horses and pigs. Since this vitamin is synthesized in the digestive tract of domestic animals, for many years it was believed that supplemental biotin was not required. During the mid-seventies, however, cases of mild biotin deficiencies appeared in intensely managed livestock production systems. The most traumatic visual symptom of biotin deficiency in livestock is dermatitis or skin lesions frequently associated with the hooves. Through further research it has now been determined that biotin is required by enzymes responsible for protein synthesis and, therefore, it is an essential vitamin for the growth of hair and hooves.

Methionine is an essential amino acid which means it must be obtained from the diet by monogastric animals. The body utilizes methionine and the nonessential amino acid serine to synthesize the amino acid cysteine. Cysteine provides disulfide (-S-S-) cross links between adjacent polypeptide chains and is a key component of the keratin which forms the hair and hooves of various domestic animals. Accordingly, it should be appreciated that methionine in the diet is necessary to ensure an adequate cysteine concentration for protein synthesis and healthy hair and hoof growth.

Zinc is a mineral which is required in livestock diets. One primary metabolic function of zinc appears to be its role as a zinc metallo-enzyme. Body concentrations of zinc are highest in the epidermal tissue such as the hair and hoof. Zinc deficiency has been reported in various animals including horses. Deficiency symptoms include skin breaks around the hooves, rough scaly skin and reduced growth.

Recent evidence further indicates that zinc may be involved in epidermal physiology. More particularly, it has been reported that cysteine incorporation into epidermal proteins including keratin was 80% lower in zinc deficient rats compared to zinc supplemented control animals. Additionally, the use of topical zinc therapy for dermatologic disorders suggests a basis for its efficacy.

From the above it should be clear that dietary supplemental compositions are necessary to ensure healthy skin, hair and hoof growth. A number of such supplements are presently available in the marketplace. These supplements, however, suffer a number of shortcomings. They typically do not address the deficiencies which may exist in each of the three groups: vitamins, minerals and essential amino acids. They also are relatively expensive to produce. Many of the nutritional supplements are also provided in a form which may be inefficiently metabolized by the body and, hence, are not fully beneficial to the animal.

Accordingly, it is clear that a need exists for an improved nutritional supplement composition particularly directed to improving the hoof and hair coat of domestic animals. Such a product is of particular interest and benefit to horse owners as horses with hooves which crack, crumble and are weak have an increased chance of lameness and a reduced potential for physical activity. In addition, horses with poor hair coats rarely realize their full potential in either the show or sale ring. Thus, a nutritional product which may improve the hardness, integrity and conformation of the hoof while also improving hair quality would have a tremendous impact on a horse's performance and value.

SUMMARY OF THE INVENTION

It is, accordingly, one object of the present invention to provide improved nutritional supplement compositions that are relatively inexpensive to produce and yet provide efficient and effective treatment of nutritional deficiencies adversely affecting the healthy growth of hair coat and hooves in domestic animals.

A further object of the present invention is to provide a safe and effective method of use of nutritional supplement compositions of the present invention in treating and/or preventing various hair coat and hoof conditions and ailments.

Other objects and advantages of the present invention will become apparent as the description thereof proceeds. In satisfaction of the foregoing objects and advantages, there is provided by this invention a nutritional supplement composition for the hoof and hair coat. The composition includes by weight percent substantially 96.0%–0.0% palatable carrier, 50.0%–2.0% DL-methionine, 0.25%–0.01% biotin, 20.0%–2.0% yeast culture and yeast fermentation solubles, 5.0%–1.25% zinc methionine, 0.40%–0.0% preservative, 1.5%–0.0% antioxidant agent and 20.0%–0.0% flavoring agent.

The carrier may be any known carrier or grain deemed palatable to horses. Oatmeal feed makes an excellent carrier.

The preservative may be any agent which preserves the composition and contains a generally recognized as safe mold inhibitor including proprionic acid, ammonium hydroxide, acetic acid, benzoic acid, sorbic acid, tartaric acid or any mixtures thereof.

The antioxidant agent may be any such known agent and preferably one containing ethoxyquin. The flavoring agent may be any form of cane molasses or other flavoring palatable to the animal for which supplementation is desired.

A preferred formulation for the nutritional supplement composition of the present invention comprises by weight percent substantially 75.5% palatable carrier, 10.5% DL-methionine, 0.07% biotin, 6.25% yeast culture and yeast fermentation solubles, 5.0% flavoring agent, 1.25% zinc methionine, 0.01% preservative and 0.02% antioxidant agent.

In accordance with a further aspect of the present invention, a method for treating and preventing various hoof and coat ailments in an animal resulting from nutritional deficiencies comprises the step of feeding the animal between 0.5 and 3.0 ounces per day of a nutritional supplement composition as described above. Preferably, this feeding may be done by top dressing the composition over the horse's regular feed. Alternatively, the composition may be fed alone. The lower feeding levels from 0.5 to 1.0 ounces per day may be used primarily as a prophylaxis to maintain fine hair and hoof growth and overall quality. The larger feedings of from substantially 1.0-3.0 ounces per day may be beneficial for horses or other animals suffering from any of various hoof ailments. In any event, since hooves grow slowly, and only new hoof growth will benefit from the nutrients in the supplement compositions, several weeks or even months of supplementation may be necessary before results are seen.

DETAILED DESCRIPTION OF THE INVENTION

As indicated above, the present invention is drawn to novel nutritional supplement compositions. These compositions are useful in a method of the present invention for preventing and/or treating certain hoof and hair coat ailments in domestic farm animals.

The nutritional supplement compositions comprise by weight percent substantially 96.0%-0.0% palatable carrier, 50.0%-2.0% DL-methionine, 0.25%- 0.1% biotin, 20.%-2.0% yeast culture and yeast fermentation solubles, 5.0%-1.25% zinc in chelated forms such as zinc methionine, 0.4%-0.0% preservative, 1.5%-0.0% antioxidant agent and 20.0%-0.0% flavoring agent.

The compositions may be presented in a number of forms including a paste form which is added to the regular horse feed and a meal which may be sprinkled over the regular feed.

Preferably, however, the compositions are designed and adapted for forming into pellets which may be top dressed over an animal's feed or even fed alone. The pellets may be formed in a standard "steam tempering" process, a cold process or an extrusion process. Advantageously, by forming the supplement into uniquely shaped pellets it may be easily determined if the animal to which administration is desired is consuming the supplement.

Accordingly, the carrier utilized in the formulation may be any known carrier palatably to the animal being treated. When treating horses, oatmeal feed (such as available from LaCrosse Milling Company of Cochran, Wis.) is particularly effective for this purpose. Additionally, flavoring agents (20.0%-0.0%) may be provided to further enhance the aroma and taste of the supplement composition so as to encourage consumption by the animal. Natural flavoring agents such as cane molasses may be utilized. Alternatively, synthetic flavoring agents included Honey Essence 232, Caramel 204 and Apple 160 as available from Alltech, Inc. of Nicholasville, Ky.

As should be appreciated, the composition includes 50.0%-2.0% DL-methionine. As discussed above, methionine is an essential amino acid that must be consumed in the diet of the animal as it cannot be produced within the animal's body. Methionine is also the precursor to cysteine. Thus, if levels of cysteine in the diet are low, an adequate supply of methionine must be provided to meet not only the body's need for methionine, but also to provide a sufficient quantity to be used for synthesis of cysteine. Cysteine is a key component of keratin which is the major protein in hair and hooves. Accordingly, methionine supplementation ensures an adequate basis for the synthesis of cysteine and the production of keratin for healthy hair and hoof growth.

The supplement composition also includes from 0.25%-0.1% biotin. Biotin is essential for many enzymes which act as catalysts in carboxylation reactions. Some of these reactions include the biosynthesis of fatty acids in gluconeogenesis (the conversion to glucose from glycogen), the conversion of carbohydrates to protein as well as the conversion of protein to carbohydrates. Sufficient levels of biotin are required for normal, healthy skin, hair and hooves. The present composition provides supplementation to reach those levels without presenting any significant risk to the animal. This is because biotin is a water-soluble vitamin, and, therefore, any excess biotin not required by the animal is simply excreted in the urine.

The supplemental composition of the present invention also includes 20.0%-2.0% yeast culture and yeast fermentation solubles. Yeast culture and fermentation solubles are an excellent source of B vitamins including biotin. It is believe that feeding live yeast culture to horses is beneficial for several reasons. For example, horses which have been sick or stressed or which have been receiving certain oral medications may have had the bacterial populations in their digestive tracts adversely affected. When this occurs, the animal may no longer be producing sufficient levels of B vitamins to maintain a healthy condition. Accordingly, supplementation of the animal's diet with yeast culture may be quite beneficial to restore the necessary levels for best health.

Additionally, yeast culture is also an excellent source of amylase. This amylase augments the starch digestion capacity of the horse. Accordingly, supplemental enzymes may be beneficial to a horse under stress and lead to an increase in digestibility.

The present compositions also include 5.0%-1.25% zinc methionine. As indicated above, zinc is an essential trace mineral required for normal growth, reproduction and body maintenance. Zinc storage in an animal's body is, however, limited and therefore it must be provided in adequate levels in the daily food intake. By providing zinc in a chelated form, the composition of the present method makes zinc readily available to the animal through the digestive system.

The composition may also include preservatives. These preservative agents selected from a group including propionic acid, ammonium hydroxide, acetic acid, benzoic acid, sorbic acid, tartaric acid and mixtures thereof inhibit mold growth and extend the shelf life of the composition without adversely affecting the animal when the composition is eventually consumed. An excellent mold inhibitor agent is available under the trademark MOLD ZAP from Alltech, Inc. of Nicholasville, Ky.

Finally, the composition may also include an antioxidant agent such as one available from Monsanto Agricultural Company of St. Louis, Mo. under the trademark SANTIQUIN. Preferably, the antioxidant agent includes ethoxyquin. The provision of the antioxidant agent is desired to prevent oxidation and breakdown of certain components of the composition prior to consumption by the animal. In this way, the compositions are maintained in a stable chemical state most readily available for absorption through the digestive track of the animal.

Advantageously, the nutritional supplement composition of the present invention provides full supplementation to the diet in the vitamin, mineral and essential amino acid areas to ensure good, healthy hair and hoof growth. The biotin, zinc and methionine provided in the present supplement composition are also readily available for absorption by the animal so as to be most effective. More particularly, the yeast culture and fermentation solubles are believed to enhance the digestion of these vitamin, mineral and amino acid components. Thus, these components may be provided in the composition at lower concentration levels yet still be absorbed for utilization by the animal at higher levels than possible with other prior art supplements. This is true even of prior art compositions which include one or more of these supplements at significantly higher concentration levels.

Because these vitamin, mineral and amino acid supplements are relatively expensive to produce, the present invention represents a significant advance in art. More particularly, since lower concentrations of the vitamins, minerals and amino acid supplements may be provided in the composition without adversely affecting the therapeutic effectiveness of the composition, the composition may be produced at a lower overall cost.

The method of the present invention includes the step of feeding an animal between 0.5 and 3.0 ounces of the composition described above per day. The particular feeding level is determined by weighing a number of factors including the size of the animal and the purpose of the administration. For example, a pony which does not presently suffer from any hoof or coat ailment and for which the treatment is for prophylactic purposes should receive between 0.5 and 1.0 ounces of the supplement per day. A larger horse, such as a full grown Thoroughbred, under the same circumstances, should receive between approximately 1.0 and 1.5 ounces of the supplement per day.

Where a horse is suffering from one or more ailments including thin hoof walls, dry brittle hooves and wall cracks, treatment of this condition may require the administering of between 1.5 and 3.0 ounces of the supplement per day. The daily feeding size will be determined to a large part by the extent of the ailment and the size of the animal receiving the treatment. It should also be recognized that the treatment must be administered for a period of several and, more preferably, at least five months for best effect. This is because hooves grow at a relatively slow rate of approximately ¼"–⅜" per month and only new hoof growth will benefit from the nutrients in the supplement composition. Thus, it may take several months before any results from the supplementation are actually seen.

The following examples are to further illustrate the invention but it is not to be considered as limited thereto.

EXAMPLE 1

The following ingredients were weighed and placed in a horizontal batch mixer (Marion 2-Ton Extra Heavy Duty Mixer; Rapids Machinery Company, Marion, Iowa) in the order shown: 1,371.8 lbs. feeding oatmeal (LaCross Milling Company, Cochrane, Wis.), 125.0 lbs. yeast culture and fermentation solubles (AFS, Alltech, Inc., Nicholasville, Ky.), 50.0 lbs. zinc methionine (Zinpro 100, Zinpro Corp., Minneapolis, Minn.), 210.0 lbs. DL-methionine (Rhone-Poulenc, Inc., Monmouth Junction, N.J.), 140.8 lbs. Biotin 1% premix (Hoffman-LaRoche, Inc.), 1.0 lbs. sorbic acid (Aflaban, Monsanto Agricultural Co., St. Louis, Mo.), 1.0 lbs. preservative (Mold Zap, Alltech, Inc.), 0.4 lbs. antioxidant agent (Santoquin, Monsanto Agricultural Co.), 100 lbs. cane molasses (Cargill, Inc., Minneapolis, Minn.). The batch was then mixed for three minutes and discharged into a surge or mash bin set above a pellet mill (CPM, Century Model Pellet Bill, California Pellet Mill Company, Crawfordsville, Ind.).

The batch is then metered via a variable speed screw conveyor from the mash bin into a steam and molasses conditioning chamber. Inside the conditioning chamber the mash, as the batch is now called, was tempered with steam to 150° F. At that point, molasses was added at the appropriate rate determined by the formula. The heated, moisture laden mash was then passed from the conditioner into the pellet chamber. There the mash as pressed through a 3/16" diameter, 2" thick pellet die. The pellets exiting the die were then sheared off at the die surface to a length of approximately ¼".

The pellets then fell into a vertical cooler (CPM Model 2BA2, California Pellet Mill Co.). There negative pressure air flow cooled the pellets to within 5° to 10° F. of ambient air temperature. The cooled pellets were then gravity fed to a screener which removes fines, dust and broken pellets. These are then recycled back to the mash bin to be remade. The pellets are then delivered from the screener into a bagging bin and were packaged by weight into shipping containers.

EXAMPLE 2

A nutritional supplement composition in paste form is made by weighing and adding to the mixer of Example 1, 398.0 lbs. of yeast culture and fermentation solubles (AFS), 159.2 lbs. of zinc methionine (Zinpro 100), 668.6 lbs. of DL-methionine, 448.2 lbs. of biotin 1% premix, 3.2 lbs. of sorbic acid (Aflaban), 3.2 lbs. of preservative (Mold Zap), 1.2 lbs. of antioxidant agent (Santoquin) and 318.4 lbs. of cane molasses. The batch is then mixed for three minutes and collected for packaging in tubes of appropriate size. When using, an appropriate amount of the paste is squeezed from the tube onto the feed of the animal to which administration is desired.

EXAMPLE 3

The same as Example 2 but the sorbic acid and preservative are eliminated and a flavoring agent such as Honey Essence 232 as available from Alltech, Inc. is used in place of the cane molasses.

EXAMPLE 4

The procedure set forth in Example 1 is utilized but the weight of the components in the formulation are as follows: 686.0 lbs feeding oatmeal, 261.6 lbs. yeast culture and fermentation solubles (AFS), 104.6 lbs. zinc methionine (Zinpro 100), 439.4 lbs. DL-methionine, 294.4 lbs. Biotin 1% premix, 2.0 lbs. sorbic acid (Aflaban), 2.0 lbs preservative (Mold Zap), 0.8 lbs. antioxidant agent (Santoquin) and 209.2 lbs. cane molasses for flavoring.

I claim:

1. A nutritional supplement composition for the hoof and coat comprising by weight percent substantially:
   96.0% to 0.0% palatable carrier;
   50.0% to 2.0% methionine;
   0.25% to 0.01% biotin;
   20.0% to 2.0% live yeast culture and yeast fermentation solubles;
   5.0% to 1.25% zinc in chelated form;
   0.40% to 0.0% preservative;
   1.5% to 0.0% antioxidant agent; and
   20.0% to 0.0% flavoring agent.

2. The nutritional supplement composition set forth in claim 1, wherein said palatable carrier is a grain.

3. The nutritional supplement composition set forth in claim 2, wherein said grain is oatmeal feed.

4. The nutritional supplement composition set forth in claim 1, wherein said preservative is selected from a group including proprionic acid, ammonium hydroxide, acetic acid, benzoic acid, sorbic acid, tartaric acid or any mixtures thereof.

5. The nutritional supplement composition set forth in claim 1, wherein said antioxidant agent contains ethoxyquin.

6. The nutritional supplement composition set forth in claim 1, wherein said flavoring agent is cane molasses.

7. A nutritional supplement composition for the hoof and coat, comprising by weight percent substantially:
   75.56% palatable carrier;
   10.5% DL-methionine;
   0.07% biotin;
   6.25% live yeast culture and yeast fermentation solubles;
   5.0% flavoring agent;
   1.25% zinc methionine;
   0.01% preservative; and
   0.02% antioxidant agent.

8. The nutritional supplement composition set forth in claim 7, wherein said palatable carrier is oatmeal feed.

9. The nutritional supplement composition set forth in claim 7, wherein said flavoring agent is cane molasses.

10. The nutritional supplement composition set forth in claim 7, wherein said preservative is selected from a group including proprionic acid, ammonium hydroxide, acetic acid, benzoic acid, sorbic acid, tartaric acid or any mixture thereof.

11. The nutritional supplement composition set forth in claim 7, wherein said antioxidant includes ethoxyquin.

12. A method for treating and preventing various hoof and coat ailments in an animal resulting from nutritional deficiencies, comprising the step of:
   feeding said animal between 0.5 and 3.0 oz. per day for at least five months of a nutritional supplement composition including by weight percent substantially:
   96.0 to 0.0% palatable carrier;
   50.0% to 2.0% methionine;
   0.25% to 0.01% biotin
   20.0% to 2.0% live yeast culture and yeast fermentation solubles;
   5.0% to 1.25% zinc in chelated form;
   0.40% to 0.0% preservative;
   1.5% to 0.0% antioxidant agent; and
   20.0% to 0.0% flavoring agent.

13. The method set forth in claim 12, wherein said carrier is a grain.

14. The method set forth in claim 12, wherein said carrier is oatmeal feed.

15. The method set forth in claim 12, wherein said preservative is selected from a group including proprionic acid, ammonium hydroxide, acetic acid, benzoic acid, sorbic acid, tartaric acid or any mixtures thereof.

16. The method set forth in claim 12, wherein said antioxidant agent contains ethyoxyguin.

17. The method set forth in claim 12, wherein said flavoring agent is cane molasses.

* * * * *